United States Patent [19]
Knapp

[11] 3,884,192
[45] May 20, 1975

[54] ANIMAL-OPERATED SPRAYER

[76] Inventor: Frank Knapp, Rt. 3, Mineral Point, Wis. 53565

[22] Filed: Oct. 15, 1973

[21] Appl. No.: 406,550

[52] U.S. Cl. .............................................. 119/159
[51] Int. Cl. .......................................... A01k 29/00
[58] Field of Search ..................... 119/159, 160, 156

[56] References Cited
UNITED STATES PATENTS

| | | |
|---|---|---|
| 1,438,410 | 12/1922 | Taylor et al. ........................ 119/159 |
| 1,767,560 | 6/1930 | Snyder ................................ 119/159 |
| 3,602,199 | 8/1971 | Diggs .................................. 119/159 |
| 3,699,928 | 10/1972 | Cowan ................................ 119/159 |

*Primary Examiner*—Hugh R. Chamblee

[57] ABSTRACT

An animal-operated sprayer is disclosed as comprising a gate or entrance into an enclosure through which animals may freely travel under their own volition and be actuated by the animal's weight to instantaneously provide a fine spray of treatment fluid at constant pressure over the animal's body.

4 Claims, 4 Drawing Figures

PATENTED MAY 20 1975 3,884,192

ANIMAL-OPERATED SPRAYER

BACKGROUND OF THE INVENTION

A common problem encountered by persons raising livestock and in particular, cattle, is weight loss and slow weight gain. Factors contributing to this problem, among others, are face flies, heel flies, infectious pink eye and lice in cold weather. While insecticides and other appropriate treatment substances are effective and have been used in successfully combatting the aforenoted detrimental factors; experience has indicated that many difficulties arise concerning the ease and thoroughness of application of the treatment, as well as the duration of its effectiveness. Another problem occasioned by treatment of livestock is the many man-hours of work required to be expended in order to effectively treat the livestock.

One known prior art manner has been to round-up cattle and then drive them through an opening into a corral. A person positioned by the entrance of the opening then sprays the cattle as they pass into the corral. Several disadvantages are attendant in the use of this particular method. Many laborious and expensive man-hours are needed to round-up and drive the cattle into the corral. Further, the application of the treatment fluid is not uniformly applied to each cow and, as is often the case, the treatment fluid is only good until the next rainfall, thereby requiring the cattle to be rounded-up several times during a season.

Other known prior art devices included a frame defining a passage for the movement of cattle provided with a spray nozzle and a lever-type platform responsive to the weight of the cow for actuating a spray of treatment fluid through the nozzle onto the cattle. This category of prior art device, while on improvement over the aforenoted method, is nevertheless not completely satisfactory in operation. One of the most significant drawbacks is the accompanying noise as well as the height through which the platform must move, both of which factors impose a reluctance on the part of the animal to enter the device. Also, the construction of the device is such that the cattle are not able to go through these devices in both directions. The height of the base plate at the ends thereof is of such dimension as to make it virtually impossible for cattle to step over. Mention should be made of the fact that cattle cannot step very high, or at least are reluctant to do so.

Other similar devices such as disclosed in the patent to Diggs, U.S. Pat. No. 3,602,199 are also so designed as to require the cattle to be driven through the sprayer. As is apparent, this procedure requires many man-hours being expended in order to drive the cattle through the sprayer. Obviously, this is an inefficient and uneconomical method. Additionally, such a device cannot be used on the open range or any pasture due to the necessity for someone to forcibly move the cattle through the sprayer, as well as the inability of cattle to step high enough so as to travel over the base plate of the sprayer.

As mentioned, many of the prior art automatic sprayer devices are so constructed that in their operation they frighten cattle due to excessive moving of components thereof, and the noise accompanying their operation. Moreover, these sprayer devices are not effective, in the sense that they also frighten cattle by a blasting spray. Other prior art devices such as dust bags and wick-type cattle oilers, have been found to be equally ineffective.

SUMMARY OF THE INVENTION

Accordingly, it is an object of the present invention to overcome the aforediscussed disadvantages prevalent in the prior art by providing an automatic sprayer that permits cattle to freely and easily pass therethrough on their own volition in either direction without difficulty or the necessity of force.

It is another object of the invention to provide an automatic sprayer that is simple in construction and so constructed as to provide for minimum movement and noise in the operation thereof, thereby minimizing the tendency of the cattle to be frightened.

It is another object of the invention to provide an arrangement, wherein the cattle will actuate the automatic sprayer without the necessity of human assistance in directing them through the sprayer.

It is another object of the invention to provide an automatic sprayer having loaded hydraulic lines that instantaneously applies spray to the surface of the cattle at constant pressure as the cattle enters the sprayer.

It is another object of the invention to provide an automatic sprayer that will not frighten cattle when sprayed and that will substantially and uniformly cover the cattle with treatment fluid.

These aforementioned and other objects are accomplished by providing an automatic animal sprayer having a frame which defines a passage through which the animal travels. Actuation of the sprayer is accomplished by means of first and second movable platforms that are pivotally mounted on respective opposite ends of the frame through which the cattle enter. These pivoted ends are located in close proximity to the ground and the platforms are lowered under the animals weight only a minimal distance to actuate the spray. Cattle therefore naturally travel through the sprayer because there is not reluctance or difficulty on their part to ascend onto or descend from the platforms. Actuation of the sprayer is also unaccompanied by noise and there are a minimum of moving parts. The actuation unit for the automatic sprayer is preferably a hydraulic pump, the actuating piston of which is directly coupled to adjacent ends of the platforms and a hydraulic system actuated by depression of the platforms under an animal's weight is so loaded that vertical travel of the platforms may be kept so small as not to unduly frighten the animal entering thereon. The direct connection also eliminates conventional linkage systems and insures that the platforms and actuating piston move conjointly. The platforms are biased upwardly by compression springs suitably designed to not only yieldingly support the weight of the cattle but also define an upward limit for the platforms' movement. A downward limit for the movement of the platforms is determined by a circular member on the piston rod, which cooperatively engages the platforms and abuts the hydraulic cylinder of the pump.

The sprayer system for the automatic sprayer of the present invention includes a plurality of fine spray nozzles and the hydraulic circuit which operatively connects the nozzles to the platform actuated pump is constantly loaded so as to instantaneously apply treatment fluid in a fine mist, and at high velocity and constant pressure to the exterior surface of cattle as the animal enters the sprayer. The nozzles also are so designed and spatially arranged as to substantially and uniformly spray over the entire surface area of each cow as it passes therethrough.

The aforenoted automatic sprayer has been found to be effective in permitting cattle to pass unaided therethrough in either direction without being frightened by excessive movements, noise or blasts of spray. Thusly, the present invention enables individuals to have herds of cattle effectively treated on the open range of pasture by utilizing the automatic sprayer as an entrance into an enclosure that normally contains provisions for cattle. Thereby, as cattle instinctively and naturally enter the enclosure to the provisions, they in doing so are chemically treated.

These and other objects, advantages and other features of the invention will become apparent after a detailed description of the present invention when viewed in conjunction with the accompanying drawings wherein like reference numerals designate like structure:

DETAILED DESCRIPTION OF THE PREFERRED EMBODIMENTS

Figure 1:
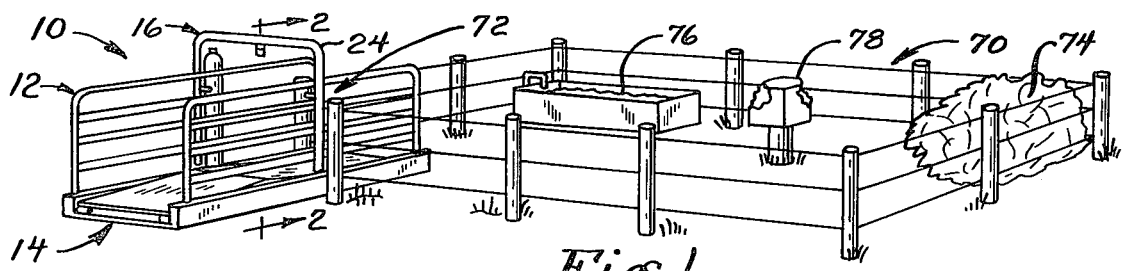
FIG. 1 is a perspective view of an animal actuated sprayer in accordance with the present invention defining an opening for an enclosure that encloses provisions for cattle.

Now referring to the Figures in the drawing, there is disclosed an animal-actuated sprayer 10 made in accordance with the principles of the present invention and serving as the entrance to a corral or enclosure 70 located within a pasture and containing provisions for cattle or other animals confined within the pasture. As more particularly disclosed in FIGS. 1 and 4, the automatic sprayer 10 includes a frame assembly generally designated by reference character 12. Cooperating with frame assembly 12 is a ground level actuation unit 14 onto which an animal such as cattle enter to gain access to enclosure 70 and which is responsive to the weight of the entering cattle for actuating a spray system 16 that is fluidly loaded so as to instantaneously spray the cattle at high velocity and constant pressure with a treatment fluid.

The frame assembly includes a generally rectangular constructed low-level base 18 made of a durable and wear-resistant material that rests on and preferably into the ground surface 20 to be level therewith. Rails 22 extend along longitudinal edges of the base 18 and are connected thereto. A U-shaped overhead member 24 connects the ends of the base and with rails 22 defines a passage through which livestock such as cattle can pass into or from enclosure 70. In base 18 are two generally rectangular metal platforms 26 arranged in generally end-to-end relationship with respect to each other and having opposite ends 28 generally terminating at the opposite ends 30 of the frame. The outer ends 28 of said platforms are attached, as by welding, to a rotatable pivot journal 32 mounted on endwise extending rods 34 connected between the opposite frame ends 30. While this particular pivotal arrangement has been disclosed, it is within the scope of the invention to provide other conventional means to pivot the platform ends 28. The opposite ends 36 of platforms 26 essentially meet midway of said entrant ends 30 of the frame assembly and are movable together in a generally vertical direction downwardly in response to the weight of cattle entering onto either platform.

Figure 4:
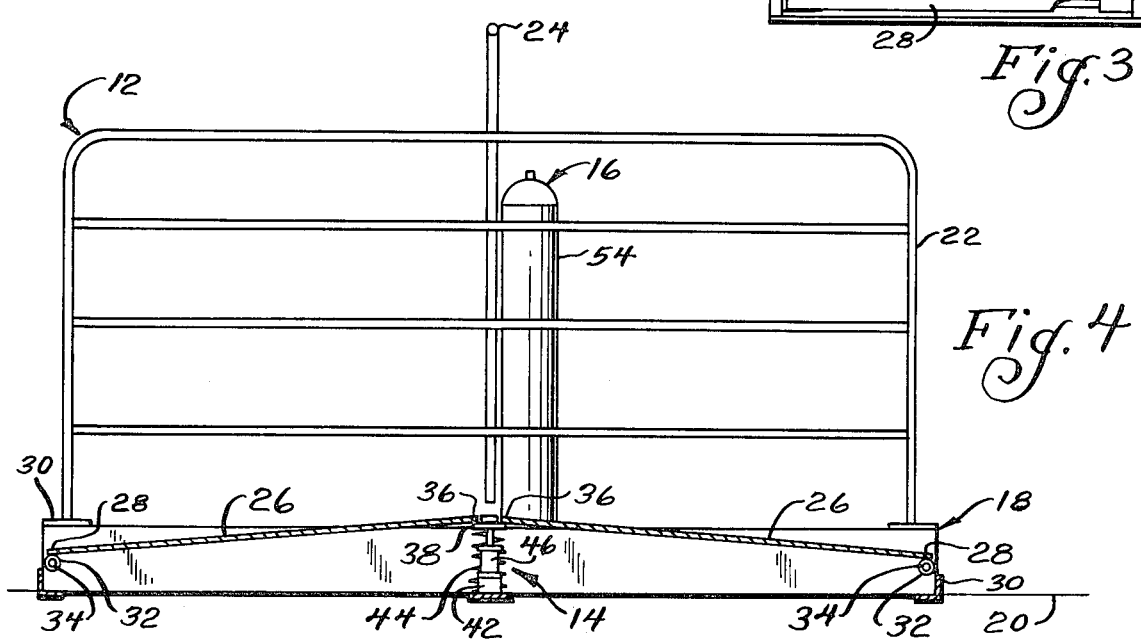
FIG. 4 is a side elevational view, party in section, showing further details and arrangement of the actuation means of the present invention.

Now referring particularly to FIG. 4, each of the adjacent inner ends 36 of platform 26 are supported on a circular support member 38 suitably attached to a piston rod 40 of a conventional piston-actuated hydraulic pump 42. At either side of pump 40 are a plurality of coil compression springs 44 located to cooperate with piston rod 40 to abuttingly contact the underside of platform ends 36 and yieldingly support the weight of the cattle passing thereover. Compression springs 44 are so designed as to be responsive to the weight of cattle to permit actuation of pump 40; at the same time they are effective to limit the generally upward movement of platforms 26 and piston rod 40 so that in the rest position of the platforms as illustrated in FIG. 4, the inner ends 36 of the platforms are in the order of 1½ inches above the height of their outer ends 28. Because of the related length of the platforms 26 (preferably about 4 ft.) the platforms in their raised state are at such a slight angle from horizontal, and their outer ends being at ground level or proximate thereto, the cattle have little difficulty or reluctance in ascending onto or descending from platforms 26 in passing through the sprayer. Downward movement of the inner ends 36 of the platforms is limited by circular member 28 contacting the top surface of hydraulic cylinder 46 so that the two platforms do not drop below horizontal. The limited movement thus required of the platforms to operate the sprayer system as afterwards described in practice has been found insufficient to frighten the cattle and particularly because actuation of the spray system 16 is otherwise essentially noise free. The disclosed arrangement also limits each spraying to a predetermined maximum so that an animal halting on the platform will not empty the supply tank.

Figure 2:
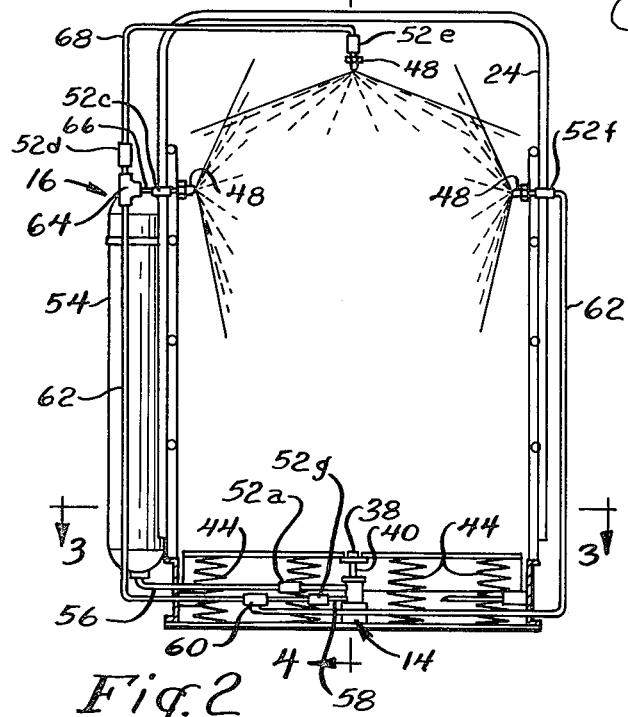
FIG. 2 is a view of the sprayer taken along section line 2—2 of FIG. 1.
Figure 3:
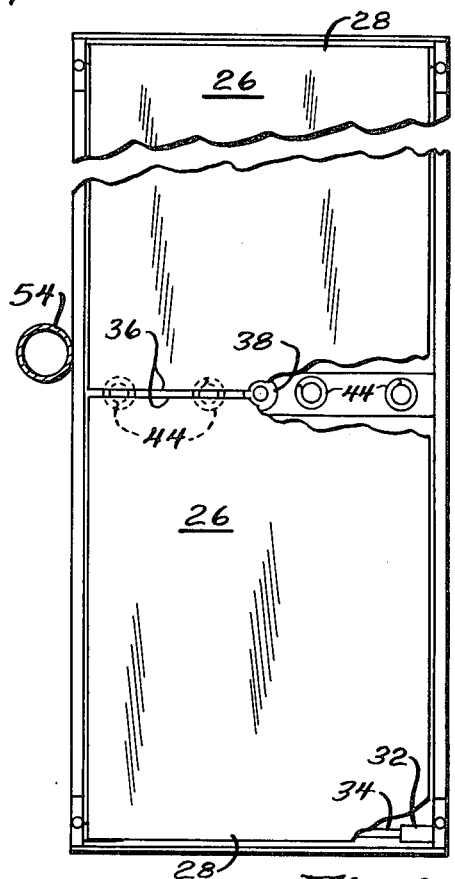
FIG. 3 is a planar view of the sprayer embodying the principles of the present invention and having certain portions thereof omitted for clarity in showing the actuation and biasing means of the present invention.

Referring now to FIG. 2, the spray system 16 includes a plurality of spray nozzles 48 and a hydraulic circuit 50 having conventional one-way check valves 52 by which it is loaded to provide instantaneous dispensing of a spray at high velocity and a constant pressure with lowering of either platform 26. Suitably attached to frame 12 is a storage tank 54 containing any suitable treatment fluid useful to disinfect and protect cattle. The treatment fluid is maintained under constant pressure within tank 54 and is fed by gravity through inlet line 56 into hydraulic cylinder 46. Interposed between tank 54 and hydraulic cylinder 46 is a one-way check valve 52a, so arranged as to permit fluid to flow only in one direction, that is from the tank to the cylinder. A fluid outlet line 58 extends from the lower portion of hydraulic cylinder 46 to a first T-coupling 60. Fluidly interconnected between and located in line 58 is another one-way check valve 52b that permits fluid under a predetermined pressure to exit from pump 42 and travel to T-coupling 60. A pari of fluid lines 62 branch pair T-coupling 60 and lead to spray nozzles 48, one on each side of the passage defined through the sprayer by its frames 54, to permit spraying of the cattle from opposite sides. One of the lines 62 extends generally upwardly and communicates with a second T-coupling 64. A line 66 extends therefrom to one-way check valve 52c for a laterally spaced sprayer nozzle 48. Another line 68 extends to a vertically disposed spray nozzle 48 and has two one-way check valves 52d and 52e interconnected therein. The other of lines 62 extends from the T-coupling 60 and terminates at another one-way check valve 52f for the other laterally placed spray nozzle 48. The one-way check valves 52 of the present invention are so arranged and functionally cooperate with each other so as to maintain treatment fluid within the lines 62, 66 and 68 at all times. Thus, the one-way check valves adjacent the nozzles 48 permit fluid to flow thereto, while the other one-way check valves within the lines 62, 66 and 68 prevent fluid from returning to both T-couplings 60, 64. Upon downward movement of the platforms 26, pump 42 will instantaneously apply a sufficient pressure to insure that treatment fluid in the loaded lines 62, 66 and 68 will exit at constant pressure and at high velocity through nozzles 48 to dispense the treatment fluid.

As best disclosed in FIG. 2, the nozzles 48 are so arranged as to be spaced laterally and above the platform 26, so as to effectively, as well as uniformly spray substantially the entire surface area of the cattle passing therethrough. Nozzles 48 are preferably of a type which dispense a hollow cone spray of a wide angle and high velocity, but atomized so as to provide a fog or mist which obtains maximum coverage of the animal quickly as it passes therebetween but silently and with so little pressure as not to scare the animal. A suitable nozzle for this purpose is shown and described in U.S. Pat. No. 2,666,669 to which reference may be had for a further understanding of its construction and operation. The amount of treatment fluid dispensed upon each actuation will be determined by the volume of the pump chamber, the stroke of the piston 40 and the orifice size of the nozzles 48. Preferably such a relationship is selected to discharge a maximum of 3 to 5 ounces of fluid in 5 seconds with each stroke of the piston.

In operation of the automatic sprayer 10, as a cow enters either end of the sprayer to pass therethrough, the platform 26 moves downwardly under the weight of the animal until circular support member 38 contacts hydraulic cylinder 46 to overcome the yielding bias of the compression springs 44 and actuate the pump. Should an animal remain on the platform 26 longer than said 5 seconds, or other time interval required to lower member 32 into contact with cylinder 46, further discharge of the spray is automatically halted, preventing the emptying of supply tank 54. As aforementioned, the lowering of the platform is relatively small, about 1½ inches or so and is not such a sudden drop or height as to frighten the animal. Additionally, due to the direct connection between platform and pump and absence of linkage, there is little or no accompanying noise.

As the piston rod 40 descends, the piston (not shown) attached thereto compresses the pressurized treatment fluid from tank 54 to hydraulic cylinder 46 into the hydraulic system 16. The one-way control valve 52a fluidly interconnected between tank 54 and hydraulic cylinder 46 prevents any fluid within the cylinder back-flowing into the tank. Thusly, the pressurized treatment fluid is forced through outlet line 58 and one-way valve 52b assoicated therewith. At T-coupling 60 the lines 62 branch. As the fluid travels through one of the lines 62 it will be at a pressure which is sufficient to overcome the bias of the one-way valve 52c located and operatively associated with lateral spray nozzles 48 to thereby effectuate the desired constant pressure, high-velocity atomized spray. As noted, this atomized spray is in the form of a fog or mist and absent pressure so that it does not frighten the animal. The other fluid line 62 branches from T-coupling 60 and permits fluid to travel upwardly to a second T-coupling 64, whereupon it travels through one-way control valve 52f to the oppositely positioned lateral spray nozzle 48. Both nozzles are thus simultaneously effective to instantaneously dispense the fog or mist spray. The line 68 from second T-coupling 64 travels upwardly through a further one-way valve 52d to the spray nozzle 48 located above and intermediate the two laterally spaced nozzles 48 so as to spray the animal from the top. On the reverse stroke of piston 40, as fluid is discharged from nozzle 44 of the hydraulic circuit, additional fluid enters from supply 54 and the lines remain fluid loaded between the pair of one-way valves 52 associated with each of the spray nozzles 48 so that a charge of pressurized fluid is available for the next actuation of the pump. By maintaining a constant supply of pressurized fluid in the lines 61, 62 and 68, pump 42 is effective to produce an instantaneous spray of the treating fluid through each of the respective spray nozzles 48 each time it is actuated.

Referring again to FIG. 1 as previously disclosed, the invention provides means whereby cattle are encouraged to periodically treat themselves with a suitable and appropriate amount of treating fluid so that the farmer is largely relieved of this chore. For this purpose the improved automatic animal sprayer 10 is located in an opening 72 to enclosure 70, which may be of a known construction and configuration and is effective to confine the movement of cattle therein. The space enclosed by the enclosure should be sufficient to accommodate several cows as well as provisions for the cows, for example, feed 74, water 76 and a mineral block 78. The invention is therefore effective, especially on the open range or any pasture because it does not require human attention; except for the restocking of the provisions. Inasmuch as cattle can freely enter the sprayer from either direction at ground level or substantially so without being subject to excessive noise, sudden movement of parts or blasts of liquid, it has been found that the cattle do freely enter the enclosure on their own accord to make use of the provisions therein and also exit therefrom. Each time the animal passes through the sprayer 10, it is sprayed with the treating fluid. Thusly, there is a substantial savings in time, man hours and expense by eliminating cattle round-ups and/or the need to drive cattle through an automatic sprayer. By reducing the number of cattle round-ups weight loss is further reduced because of less frequent stress placed on the cattle. Moreover, continuous and uniform application of the treatment fluid substantially reduces cattle afflications such as pink eye, grub control, fly control, as well as face and heel flies. Therefore, problems such as weight loss and slow weight gain attributed to cattle drives and the aforenoted cattle afflications are greatly diminished.

Thus, it has been demonstrated how all of the recited objects, advantages and features of the invention are obtained in a novel, highly practical and economical manner.

Having described my invention, I claim:

1. An automatic animal sprayer comprising a frame having a pair of longitudinal sides in spaced relation which define a passageway therebetween having entrances at its opposite ends through either of which animals such as cattle may optionally enter and exit, first and second platforms disposed at ground level between said sides of the frame in end to end relation over which the entering animals walk to exit through the opposite entrance, each said platforms having their outer end pivotally connected to said frame adjacent a respective one of said entrances so as to be at proximate ground level, resilient means supporting the adjacent inner ends of said platforms for limited conjoint vertical movement of the platforms on the pivotal connections of their outer ends such that the platforms remain nearly horizontal in both their raised and lowered positions to facilitate the animals easily entering and exiting on walking through the passageway, spray nozzle means mounted on said frame above said platforms and directed to spray fluid on an animal in said passageway, a tank for containing fluid to be sprayed and a pump for dispensing of fluid from said tank to the spray nozzle means, said pump including an operating piston and a receiving cylinder positioned below said adjacent inner ends of the platforms, the cylinder having an inlet communicating with said tank and an outlet communicating through fluid lines to the spray nozzle means, the operating piston being supportingly engaged with the inner ends of said platforms such that the pump will dispense fluid through the fluid lines to the spray nozzle means in response to lowering of said platforms under the weight of an animal walking across the platforms, first check valve means at the intake of the cylinder which permit fluid to flow only from the tank to the pump cylinder, and further check valve means at said spray nozzle means and at the pump cylinder outlet which permits fluid to flow in a direction only away from the pump cylinder to the spray nozzle means such that the fluid lines remain fluid-loaded and the spray nozzle means are immediately responsive to operation of the pump with lowering of either platform under the weight of an animal entering the sprayer.

2. The automatic sprayer as defined in claim 1 wherein in the raised position of the platforms the inner ends thereof are in the order of 1½ inches above the level of the pivoted outer ends of said platforms.

3. The automatic sprayer as defined in claim 1 wherein said spray nozzle means includes a plurality of spray nozzles, each spatially arranged relative to each other and adapted to atomize the fluid in a hollow cone spray of wide angle so as to completely cover the body of the animal.

4. An arrangement for automatically treating animals such as cattle as they freely move therethrough under their own volition comprising, in combination, an enclosure means enclosing provisions for the animals and of a size to permit freedom of movement of several of the animals to be treated, a frame defining an opening through said enclosure means for the ingress and egress of the animals to and from the enclosure means; first and second ground level platforms between said frame in end to end relation, one platform having an outer end pivotally connected to the ingress end of the frame so as to be in close proximity to the ground and the other platform having its outer end pivotally connected to the egress end of said frame so as also to be in close proximity to the ground, said platforms having adjacent inner ends, resilient means normally retaining said inner ends at a height above the height of the pivoted ends thereof; spray means on said frame to spray a fluid on an animal walking over the platforms from either direction, and actuation means disposed below and supportively engaged by the inner adjacent ends of said platforms to operate said spray means when either of said platforms is moved downwardly under the weight of an animal entering said frame to enter or exit from said enclosure.

* * * * *